United States Patent [19]

Elder

[11] Patent Number: 4,528,155
[45] Date of Patent: Jul. 9, 1985

[54] PRODUCTION OF CROSS-LINKED POLYMERIC EXTRUDED ARTICLES

[75] Inventor: Danny S. Elder, Montoursville, Pa.

[73] Assignee: Alcan Aluminum Corporation, Cleveland, Ohio

[21] Appl. No.: 512,958

[22] Filed: Jul. 12, 1983

[51] Int. Cl.³ .............................................. B29F 3/10
[52] U.S. Cl. ................................... 264/174; 264/211; 264/236; 264/347; 264/349; 264/DIG. 65; 425/113
[58] Field of Search ............... 264/174, 347, 236, 349, 264/134–135, DIG. 65, 300, 211; 425/113, 114, 445

[56] References Cited

U.S. PATENT DOCUMENTS

| 3,455,752 | 7/1969 | Gray et al. | 264/174 |
| 3,509,247 | 4/1970 | Perrone et al. | 264/134 |
| 4,058,583 | 11/1977 | Glander et al. | 264/176 R |
| 4,089,917 | 5/1978 | Takiura et al. | 264/174 |
| 4,161,419 | 7/1979 | Alia | 156/51 |
| 4,197,381 | 4/1980 | Alia | 264/174 |
| 4,234,531 | 11/1980 | Jocteur | 264/174 |
| 4,276,251 | 6/1981 | Bopp | 264/174 |

FOREIGN PATENT DOCUMENTS

| 710243 | 5/1965 | Canada | 264/174 |
| 2426100 | 12/1975 | Fed. Rep. of Germany | 264/174 |

Primary Examiner—Jeffery Thurlow
Attorney, Agent, or Firm—Cooper, Dunham, Clark, Griffin & Moran

[57] ABSTRACT

In a method of producing an extruded, cross-linked cable coating of filled polyethylene wherein the extruder is charged with commingled polyethylene pellets and filler-EPR masterbatch pellets containing a peroxide cross-linking agent, the peroxide is incorporated in the masterbatch pellets by application to and absorption in the pellets during advance of the pellets to the extruder, while the pellets are continuously maintained at an elevated temperature for preventing bleed-out of absorbed peroxide.

17 Claims, 2 Drawing Figures

PRODUCTION OF CROSS-LINKED POLYMERIC EXTRUDED ARTICLES

BACKGROUND OF THE INVENTION

This invention relates to methods of producing cross-linked polymeric extruded articles wherein a peroxide is employed as the cross-linking agent. In an important specific aspect, to which detailed reference will be made herein, the invention is directed to the production of cross-linked polymeric extruded coatings on electrical conductor cable.

Electrical conductor cable (the term "cable" being used herein to designate a single-strand wire as well as multistrand cable) is commonly provided with an insulating coating of an ethylene-containing polymer such as polyethylene, which must usually be cross-linked to impart required physical properties to the coating. In a conventional procedure for producing such coatings, a low-density polyethylene is blended with a minor proportion of a peroxide (e.g. dicumyl peroxide) capable of generating free radical sites in the polymer, and extruded (by means of an extruder having a feed screw) to form a continuous coating layer on a conductor core, which layer is then heated to activate the peroxide to effect cross-linking. Typically, the cable-coating composition includes, in addition to the polyethylene and peroxide, minor proportions of other ingredients including inert particulate filler materials (e.g. carbon black) and anti-oxidants.

Incorporation of substances such as filler materials in ethylene-containing polymer ordinarily requires high shear mixing; hence the filler and other additives cannot simply be blended with the polyethylene in the extruder, the extruder screw being incapable of providing the requisite mixing action. As described in U.S. Pat. No. 4,161,419 (the disclosure of which is incorporated herein by this reference), however, the filler material and other coating additives can be mixed with a suitable polymeric vehicle comprising an ethylene propylene rubber (and, typically, some polyethylene) to form a masterbatch for subsequent blending with further quantities of polyethylene to constitute an extrudable coating composition. High shear mixing, e.g. in a Banbury mixer, is required only to prepare the masterbatch; the blending of the masterbatch with the further quantities of polyethylene can satisfactorily be effected in the extruder, viz. by the action of the extruder screw, incident to the operation of extruding the blended material as a coating on the surface of an advancing cable. Advantageous savings in mixing costs are realized by this procedure, as compared with the alternative of subjecting the entire coating composition to high shear mixing.

Since producers of coated cable often do not have the specialized and very expensive equipment required for high shear mixing, they commonly obtain the above-described masterbatch from a supplier in already-mixed, pelletized form. That is to say, the supplier ships the masterbatch pellets to the cable producer, who stores them at room temperature for use as needed. Polyethylene, also in the form of pellets, is similarly purchased and stored by the cable producer. For the coating operation, a minor proportion of masterbatch pellets and a major proportion of polyethylene pellets are commingled and charged (i.e. still in discrete pellet form) to the extruder, where the charge is heated and worked into a substantially homogeneous, fluid, extrudable mass.

The peroxide cross-linking agent employed in the coating composition must be blended with polymeric material ahead of the extruder because unmixed peroxide, if introduced to an extruder screw, tends to lubricate the screw surfaces and thus to interfere with proper pumping action of the screw. In operations of the type described above, it has heretofore been customary for the masterbatch supplier to incorporate the peroxide in the masterbatch, so that the pellets of masterbatch as shipped to and stored by the cable producer already contain the peroxide required to effectuate cross-linking of the extruder coating. This practice, however, is attended with various difficulties. Production of the masterbatch in such case requires two mixing passes (the first to blend the polymer and filler, the second to add the peroxide), and thus adds to manufacturing costs, since the high-shear mixing required for the first pass develops high temperatures that would cause premature cross-linking if the peroxide were then present. Furthermore, under conditions of ambient temperature transport and storage of the masterbatch pellets, the peroxide bleeds out of the pellets, leading to such problems as stopped-up filters, sensor malfunction, dust buildup, and pellet agglomeration when moving or handling of the pellets is attempted. Alternative procedures, e.g. utilizing a ribbon or other blender to disperse peroxide for absorption in preformed ethylene-containing polymer pellets, and thereby to provide a supply of pellets incorporating the peroxide for shipment or storage and subsequent use, have not overcome these problems and generally are restricted to relatively low proportions of peroxide.

SUMMARY OF THE INVENTION

The present invention broadly contemplates the provision of improvements in a method of producing a cross-linked extruded article of ethylene-containing polymer, wherein pellets of polymer and a minor proportion of a peroxide cross-linking agent are charged to an extruder having a feed screw for heating, working and extrusion to form the article, followed by heating of the article to effect cross-linking thereof. Stated thus broadly, the improvements in accordance with the invention comprise the steps of providing polymer pellets in preheated (i.e. preheated to a temperature above the melting point of the peroxide) condition at a first locality, and advancing these pellets from the first locality through a second locality and into the extruder while applying the peroxide in liquid state to the surfaces of the pellets, and agitating the pellets, between the first and second localities so as to disperse the peroxide for absorption in the pellets; commingling the peroxide-bearing pellets with further quantities of preheated but peroxide-free polymer pellets at the second locality; and after absorption of the peroxide is complete, delivering the commingled pellets to the extruder for immediate admixture therein, while continuously maintaining the peroxide-receiving pellets at an elevated temperature throughout their advance from the first locality to the extruder, such that the pellet temperature is above the melting point of the peroxide until the peroxide has been absorbed in the pellets and thereafter is at a value at which the amount of peroxide soluble in the pellets exceeds the amount of peroxide absorbed therein.

The latter temperature value (hereinafter sometimes termed "holding temperature") can be below the melting point of the peroxide, though still substantially elevated above room temperature, it being understood that the solubility of the peroxide in the polymer increases with temperature. Consequently, the pellet temperature may be somewhat reduced when peroxide absorption is complete, but such reduction is not necessary; i.e. maintenance of the pellets at a temperature above the peroxide melting point even after absorption is complete will satisfy the above-stated holding temperature criterion. In at least many instances, the peroxide-receiving pellets are preferably heated to as high a temperature as is possible without causing softening of the polymer, which could lead to agglomeration of the pellets; although the peroxide will be absorbed into the polymer of the pellets at a temperature only slightly above the peroxide melting point, higher temperatures are preferred to achieve faster absorption. The aforementioned further quantities of peroxide-free pellets are preheated before the commingling step to a temperature (typically above the peroxide melting point) sufficient to prevent the peroxide-receiving pellets from being cooled, in the commingling step, below the temperature at which they are to be maintained in accordance with the invention.

As in conventional practice, the ethylene-containing polymer or polymers and the peroxide employed in this method are mutually selected such that the peroxide, when activated by heat, is capable of generating free radical sites in the polymer to cause cross-linking of the polymer, and the polymer is extrudable at a temperature below the activation temperature of the peroxide; also, the peroxide is present in a proportion effective to produce substantial cross linking in the extruded article, though ordinarily the peroxide content is not more than a few per cent by weight of the peroxide-receiving pellets. The term "peroxide cross-linking agent" is used herein to designate a peroxide having such properties, for the polymer or polymers with which it is employed, and present in such proportion. The peroxide-receiving pellets and the further quantities of pellets may be constituted of respectively different polymers; thus, the latter pellets may be pellets of polyethylene (that term being used herein in the same sense as in the aforementioned U.S. Pat. No. 4,161,419), and the peroxide-receiving pellets may comprise an ethylene propylene rubber, with which some quantity of polyethylene may be mixed. The presence of the ethylene propylene rubber appears to enhance the rapidity of absorption of peroxide and increase the proportion of peroxide that can be retained in the pellets without bleedout. Terms such as "mixed," "admixture," etc., are employed herein to refer to blending operations in which the polymeric material involved is heated to a continuous, fluid, or flowable phase, whereas "commingling" refers to the bringing together and interspersing of different types of pellets which retain their form. It will be understood that the elevated temperatures to which the pellets are heated, and at which they are maintained, in the practice of the present method are sufficiently low so that the pellets do not soften and agglomerate but remain solid and retain their form as discrete pellets until they are charged to the extruder.

In a specific sense, the invention particularly contemplates improvements in the procedure described in the aforementioned U.S. Pat. No. 4,161,419, wherein pellets of polyethylene and pellets of a masterbatch comprising a mixture of inert particulate filler material and an ethylene propylene rubber are supplied, together with a minor proportion of a peroxide cross-linking agent, to an extruder having a feed screw for admixture therein and extrusion of a coating layer of admixed polyethylene, masterbatch and peroxide onto a conductor cable followed by heating of the coating layer to effect cross-linking. As set forth in the aforementioned U.S. patent, it will be understood that the masterbatch may also contain additives other than fillers (e.g. antioxidants) and may include polyethylene as well as the ethylene propylene rubber; and that, typically, the masterbatch constitutes a smaller proportion of the total weight of pellets in the charge to the extruder than the pelletized polyethylene with which it is commingled. Both the masterbatch and the pelletized polyethylene are initially free of peroxide.

The invention in this specific sense contemplates the steps of preheating the masterbatch pellets to a temperature above the peroxide melting point at a first locality; advancing the preheated masterbatch pellets from the first locality to a second locality while applying the peroxide in liquid state to the surfaces of the preheated masterbatch pellets and agitating the masterbatch pellets with the applied peroxide thereby to effect dispersion of the peroxide and substantial absorption of the dispersed peroxide in the masterbatch pellets; at the second locality, commingling the masterbatch pellets with the polyethylene pellets, the polyethylene pellets being preheated prior to the commingling step; and after absorption of the peroxide in the masterbatch pellets is complete, delivering the commingled masterbatch pellets and polyethylene pellets to the extruder for immediate admixture therein, while continuously maintaining the masterbatch pellets at an elevated temperature (viz. at a temperature above the peroxide melting point until the peroxide is absorbed, and thereafter at a holding temperature as defined above) during performance of the advancing, commingling and delivering steps.

Thus, stated with reference to cable-coating operations as just described, the present invention contemplates addition of the peroxide at the cable-coating plant to masterbatch pellets previously containing no peroxide, in an effectively continuous operation leading directly to the final coating extrusion step. In specific illustrative embodiments, preheated masterbatch pellets and fully liquid peroxide are supplied to a screw conveyor for initial contact and dispersion during transport therein, so as to coat the pellets with the peroxide, and then the peroxide-coated pellets are subjected to continuing agitation and heat until the peroxide is absorbed in the pellets, after which the pellets are continuously maintained at elevated temperature until they have been blended with the polyethylene pellets and delivered to the extruder for coating the cable. The continued agitation and elevated temperature maintenance referred to above can be performed in an externally heated blending silo (which, like the screw conveyor, is sealed to prevent evaporation losses of peroxide) provided with a ribbon blender or other low-shear mixing device for moving the contained pellets, followed by conveyance of the masterbatch pellets to the main blender in which the masterbatch and polyethylene pellets are commingled. Alternatively, and in many cases preferably, the agitating and maintained heating of the masterbatch pellets as well as the initial application of peroxide can be performed in an extended screw conveyor which delivers the peroxide-bearing masterbatch pellets directly to the main blender.

In the foregoing procedure, the continuous maintenance of the pellets at the defined elevated temperatures, at all times after the peroxide is brought into contact with them in the screw conveyor, assures full absorption and avoids subsequent bleed-out of peroxide. The particular advantage of the invention in avoidance of bleed-out likewise overcomes the pellet agglomeration and other problems resulting from bleed-out, in a desirably simple and economical manner operable as an effectively continuous process. Also, higher concentrations of peroxide can be provided by this method than by previously known alternative procedures; and since the peroxide is added by the cable producer, the second mixing pass of masterbatch by the masterbatch supplier is eliminated, thereby reducing costs. The delivery of masterbatch pellets to the extruder, and the addition of peroxide thereto, are performed as a conveniently combined, effectively unitary operation, wherein the full absorption of the peroxide ahead of the extruder avoids the difficulties associated with unmixed peroxide in the extruder. Such absorption, it may be noted, need not be completed ahead of the main blender (i.e. before the masterbatch and polyethylene pellets are commingled) so long as the peroxide is fully absorbed prior to introduction into the extruder.

Where dicumyl peroxide is used as the cross-linking agent, the masterbatch pellets are preferably preheated to a temperature of about 90° to about 180° F. (most preferably at least about 140° F.), and are maintained (after absorption is complete) at a temperature of about 75° to at least about 100° F. Also preferably, the masterbatch pellets are advanced from the first locality along a confined path for continuously isolating the masterbatch pellets from the surrounding atmosphere at least until the applied peroxide is fully absorbed in the masterbatch pellets, and the temperature-maintaining step comprises externally heating the confined path, thereby to avoid problems of peroxide loss and/or atmospheric pollution.

Further features and advantages of the invention will be apparent from the detailed description hereinbelow set forth, together with the accompanying drawing.

DETAILED DESCRIPTION

Figure 1:
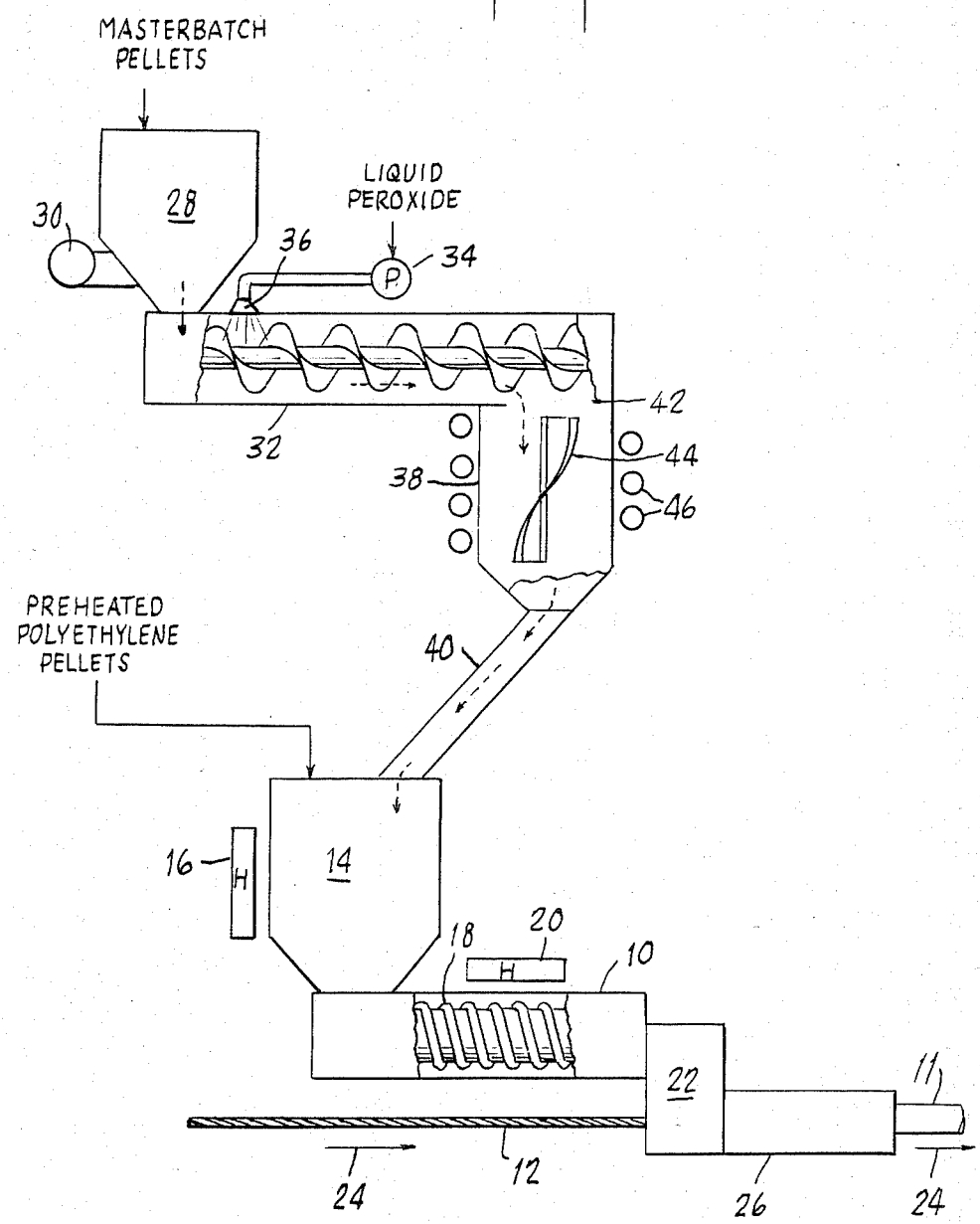
FIG. 1 is a highly simplified and largely diagrammatic view of a cable-coating line illustrating the practice of the method of the present invention in a particular embodiment.

Referring to the drawing, the invention will be described for purposes of illustration as incorporated in cable-coating procedures of the type set forth in the aforementioned U.S. Pat. No. 4,161,419, wherein pellets of a masterbatch and pellets of polyethylene are charged to a conventional cable-coating extruder 10 for admixture therein and extrusion of a coating layer 11 of the admixed material on a conductor cable 12. The masterbatch and polyethylene pellets are delivered to and commingled in a blender 14 ahead of the extruder, to achieve substantially uniform distribution of the masterbatch pellets among the polyethylene pellets, and are preheated in the blender by means represented as an external heater 16. From the blender 14, the charge of commingled pellets passes directly to the inlet of the extruder 10, where the charge is worked and advanced along the extruder barrel by the action of the extruder screw 18 while being heated (both by the working action of the screw and by external heating means 20) sufficiently to be converted to a fluid continuous phase, in which the action of the screw effects substantially homogeneous mixing of the polyethylene and masterbatch ingredients. At the outlet end of the extruder barrel, the screw 18 forces the fluid admixed coating material through a conventional extruder head 22 having a die (not shown) through which the bare cable 12 to be coated continuously advances in the direction of arrows 24; the coating material is extruded through this die onto the cable surface to form the layer 11.

As also disclosed in the aforementioned U.S. patent, the masterbatch pellets carry into the extruder a minor proportion of a peroxide cross-linking agent which is activated (i.e. to generate free radical sites in the polyethylene) only at temperatures above those reached in the extruder, it being understood that the maximum temperature in the extruder is selected, with reference to the polymeric material of the charge, to enable attainment of a fluid continuous phase of that material as necessary for extrusion. The peroxide, dispersed through the coating material by the action of the extruder screw, is activated by heating the extruded coating layer 11 on the cable advancing beyond the extruder head. This heating may be provided by passing the coated cable through a steam tube 26 beyond head 22, wherein steam is supplied at such temperature as to activate the peroxide for cross linking of the cable coating.

The masterbatch, in accordance with the aforementioned U.S. patent, comprises a substantially homogeneous mixture of inert particulate filler material and an ethylene propylene rubber (EPR) with which may be combined a quantity of polyethylene and/or conventional cable coating additives such as antioxidants, pigments, etc. Typically, the filler is finely divided carbon black, although additional or alternative fillers (e.g. clay) can be used. Suitable ethylene propylene rubbers (that term being used herein, as in the aforementioned U.S. patent, to embrace ethylene-propylene copolymers, and terpolymers of ethylene and propylene with a diene) are those having an ethylene content greater than 50% by weight. Preferably, the polymeric vehicle of the masterbatch is a mixture of EPR and polyethylene, e.g. low-density polyethylene, with the amount of polyethylene present usually being less than the amount of EPR present. Ordinarily, the ratio of total additive material (including filler but not polyethylene) to the EPR content of the masterbatch is between about 1:1 and about 5:1. The masterbatch is prepared by charging the ingredients to a Banbury mixer or like equipment wherein these ingredients are subjected to high-shear mixing until the requisite homogeneity is achieved; after discharge from the high-shear mixer, the masterbatch is cooled and pelletized in conventional manner for introduction as homogeneous solid pellets to an extruder. The pellets may be of any convenient size, e.g. about 3/16 inch in diameter.

The polyethylene employed in the present procedure may be a homopolymer, or a copolymer of a major proportion of polyethylene and a minor proportion of ethylene vinyl acetate; for example, the polyethylene content of the coating material may be low-density polyethylene, with dicumyl peroxide used as the cross-linking agent, since low-density polyethylene becomes a fluid continuous phase in an extruder at temperatures substantially below the activation temperature of dicumyl peroxide. Examples of other peroxides suitable for use in the practice of the described embodiment of the present invention include the peroxide commercially available under the trade name "Vulcup"—a mixture of the para and meta isomers of a,a'-bis(t-butylperoxy)-diisopropylbenzene; t-butyl cumyl peroxide--1,1-dimethylethyl-methyl-1-phenylethyl peroxide; and mixtures of these peroxides. Typically, the polyethylene employed (apart from the minor proportion which may be incorporated in the masterbatch) is supplied to the blender 14 in the form of pellets of virgin polyethylene comparable in size to the masterbatch pellets. Ordinarily, the virgin polyethylene pellets constitute a major proportion by weight, and the masterbatch pellets constitute a minor proportion by weight, of the total charge to the blender 14.

The procedure as thus far described is essentially the same as that disclosed in the aforementioned U.S. patent, to which reference may be made for specific examples of suitable formulations and operating conditions to produce insulating coatings for electrical conductor cable. The method of the present invention differs from these prior procedures, however, in the manner in which the peroxide cross-linking agent is supplied to the extruder. That is to say, whereas the aforementioned U.S. patent contemplates subjecting the masterbatch (after the initial high-shear mixing operation referred to above) to a second low-shear mixing operation for addition of peroxide, prior to pelletization of the masterbatch, the present invention contemplates adding the peroxide to the masterbatch after pelletization, by the operations now to be set forth.

Referring then particularly to FIG. 1, there is shown a system for advancing masterbatch pellets to the main blender 14 (and thence, commingled with the polyethylene pellets, to the extruder 10) while applying a peroxide cross-linking agent in liquid state to the masterbatch pellets and agitating the pellets with the applied peroxide to disperse the peroxide for absorption in the pellets, and while continuously maintaining the masterbatch pellets at an elevated temperature from the time they first come into contact with the pellets until they enter the extruder, all in accordance with the method of the present invention. This system includes a hopper 28 for initially holding the masterbatch pellets; a conventional hopper preheater 30 using forced hot air to be blown through the hopper 28 to preheat the pellets contained therein; a screw conveyor 32 for advancing the preheated pellets from the outlet end of the hopper 28; a peroxide metering pump 34 for supplying a measured amount of peroxide in liquid state to the screw conveyor through a spray head 36; a blending silo 38 to which the masterbatch pellets (with applied peroxide) are delivered by the screw conveyor 32; and conveying means 40 for delivering the masterbatch pellets from the blending silo to the main blender 14. The path of advance of the masterbatch pellets throughout this system is indicated in FIG. 1 by broken arrows.

The hopper 28 may be of a conventional type as normally used over extruders to contain polyethylene or like pellets, and may be provided with an arrangement of channels and screen (not shown) to enable hot air to be blown by the preheater 30 through the pellets contained in the hopper; additionally, conventional means (not shown) for agitating the pellets may be included in the hopper to prevent bridging or sticking of pellets therein. The screw conveyor 32 may be of generally conventional design for horizontal or vertical applications, but with the spray head 36 (through which liquid peroxide is sprayed or dripped onto the advancing pellets) located at its inlet end. The peroxide is provided in liquid state in order to enable the use of liquid metering apparatus (i.e. pump 34) to effect measured delivery of the peroxide to the masterbatch pellets; since the peroxide, e.g. dicumyl peroxide, is ordinarily semisolid, the arrangement employed for peroxide supply to the illustrated system incorporates a hot-water melting bath (not shown) wherein drums of peroxide are immersed, the liquid peroxide being drawn from the drums by the pump through suitable conduit means. If desired, this peroxide supply can be isolated at a location remote from the work area to facilitate avoidance of peroxide fume contamination of the work area atmosphere.

The outlet end of the screw conveyor opens into the top of the blending silo 38 through a joint 42 which is sealed from the surrounding atmosphere as are the screw conveyor barrel and the blending silo walls so that the portion of the path of masterbatch pellet advance extending from the outlet of the hopper 28 through the outlet of the silo is fully confined and isolated from the atmosphere to prevent loss of peroxide by evaporation and to avoid polluting the atmosphere with peroxide fumes. Within the silo there is disposed a low shear blending device such as a ribbon blender 44, for agitating or moving the pellets contained within the silo to promote uniform dispersion of the peroxide as well as to prevent sticking or agglomeration of the pellets. To maintain the pellets in the silo at an elevated temperature, heat is supplied thereto by means disposed externally of the silo wall (and represented, in FIG. 1, by heating coil 46 surrounding the silo) such as electric heating means, a steam jacket, or the like; again to avoid evaporation losses of peroxide and/or atmospheric pollution, the silo contents should not be heated internally with blown hot air.

The conveying means 40 may be a simple drop tube (as shown) through which the pellets fall by gravity into the main blender 14 when released from the lower end of the silo 38, or it may be a conventional pneumatic or vacuum conveyor (or other conveying arrangement) for transporting pellets. It will be understood that, while the hopper 28, screw conveyor 32, blending silo 38, conveying means 40, and blender 14 cooperatively constitute a continuous path for advance of masterbatch pellets into the barrel of the extruder 10, and while the extruder is operated continuously for extended periods to coat a continuously advancing cable, pellets are ordinarily supplied to the blender 14 at intervals, i.e. in discrete increments or batches. Thus, discharge control means (not shown) may be provided at the lower end of the blender silo to release pellets therefrom only in reponse to a demand signal for supply of additional pellets to the blender 14; the screw conveyor 32 may operate discontinuously, to deliver pellets to the blending silo only upon discharge of pellets from the silo; and the pump 34 may be synchronized with the screw conveyor so as to supply metered quantities of peroxide to and through the spray head 36 only when the screw of conveyor 32 is rotating. Suitable arrangements for provision of such control features will be readily apparent to those skilled in the art.

In an exemplary embodiment of the present method as practiced in the system of FIG. 1, masterbatch pellets as described above, containing no peroxide, are supplied to the hopper 28 and are held therein until they have been thoroughly preheated with forced hot air from the preheater 30 to a temperature above the melting point of the peroxide used, e.g. a temperature (for dicumyl peroxide) between about 90° and 180° F. (preferably at least about 140° F.). From this first locality, the preheated masterbatch pellets are advanced by the screw conveyor 32 (which is preheated, e.g. to the same temperature as the advancing pellets, so as not to cool the pellets) to the blending silo 38. At the inlet end of the screw conveyor, liquid dicumyl peroxide is applied in metered quantities (e.g. in such amounts as to provide about 1.5 to about 5% by weight of peroxide in the total masterbatch charged to the extruder) to the surfaces of the advancing pellets through the spray head 36; the liquid peroxide coats the pellets, and is substantially uniformly dispersed among the pellets by the agitating action of the conveyor screw, as the pellets advance to the blending silo. Agitation of the peroxide-bearing masterbatch pellets is continued in the silo by the action of the ribbon blender 44, while the silo temperature is maintained between about 75° and at least about 100° F. by means of the external heater 46. Since the blending silo is concerned primarily with blending rather than absorption, it may be at a temperature lower than the initial pellet preheating temperature so long as the temperature of the preheated pellets does not fall below the melting point of the peroxide. Owing to the preheating of the masterbatch pellets, they remain at a temperature above the peroxide melting point throughout their traverse of the screw conveyor, the preheating temperature (and thoroughness of pellet preheating) being such that the pellets enter the blending silo at a temperature still above the latter melting point; hence, at all times from the application of peroxide throughout their residence in the silo, the masterbatch pellets are at a temperature above the peroxide melting point. The stated temperature ranges (preheating to about 90° to about 180° F., and silo temperatures of about 75° to at least about 100° F.) are nevertheless sufficiently low that the pellets do not become fluid or coalesce, but retain their discrete, solid pellet form.

Under the described temperature conditions, the liquid peroxide is progressively absorbed by the masterbatch pellets from the point at which it is applied to coat their surfaces, i.e. during the advance of the pellets through the screw conveyor and during their residence in the silo. Conveniently, the dwell time of the pellets in the silo is selected such that absorption of the peroxide in the pellets is complete when the pellets leave the silo; typically, a total period of 30 minutes (or somewhat less) up to one hour after application of the peroxide to the pellets is sufficient for this purpose, depending on such factors as the temperature to which the pellets are preheated. It is not, however, essential that the peroxide be completely absorbed ahead of the blender 14, since (as hereinafter further explained) the elevated temperature at which the masterbatch pellets are maintained, between the silo and the extruder, can be sufficiently high so that absorption of peroxide can continue even in the main blender 14; but absorption must in any event be complete before the pellets enter the extruder, to avoid the problems caused by presence of unmixed peroxide at the extruder screw. Consequently, at least the overall dwell time of the masterbatch pellets in the system ahead of the extruder, i.e. after initial application of peroxide, must be controlled to achieve complete absorption of the peroxide.

From the silo 38, the masterbatch pellets with the completely or at least partially absorbed peroxide are advanced by the conveying means 40 to the main blender 14, where they are commingled with the separately supplied virgin polyethylene pellets that constitute the balance (ordinarily the major portion) of the coating composition. Throughout their advance from the silo to and through the blender 14, and thence to the extruder, the masterbatch pellets are continuously maintained at a temperature above the melting point of the peroxide until absorption is complete, and thereafter (in the case of dicumyl peroxide) at a temperature of at least about 75° F., not only to assure complete initial absorption of peroxide, but also to prevent bleedout of peroxide even if absorption is completed in the silo. The travel time of the pellets in the conveying means 40 may be so brief that they undergo no significant cooling from the temperature at which they leave the silo; otherwise, supplemental heating means (not shown), e.g. external heaters, must be provided for the conveying means 40 to maintain the requisite elevated temperature of the pellets therein.

In the blender 14, heat is supplied to the pellets (for maintenance of the requisite temperature) by the external heater 16 which serves also to preheat the pellet charge for introduction to the extruder. Additionally, the virgin polyethylene pellets separately supplied to the blender 14 are preheated (preferably to a temperature of about 140° to about 180° F.) ahead of the blender, sufficiently so that when they come into contact with the masterbatch pellets in the blender (being commingled therewith by a suitable conventional low-shear blending device, not shown, in the blender 14) they do not cool the masterbatch pellets below the elevated temperature required to prevent bleedout. The temperature of the pellets in the blender is also maintained at an elevated value preferably in the range of about 140°–180° F.

The method of the present invention, in its above-described embodiment, provides a safe, convenient and economical way (indeed capable of being fully automated) for a coated cable producer to introduce perxide cross-linking agents to coating compositions, viz. by incorporation in masterbatch pellets incident to and concurrently with the operation of delivering the masterbatch pellets to the extruder in the coating line. No premixing of peroxide in the masterbatch is necessary, either by the masterbatch supplier or otherwise; yet full absorption of the peroxide in the polymeric pellets is achieved ahead of the extruder, so that presence of unmixed peroxide in the extruder is avoided. Those portions of the operation which involve unmixed peroxide are performed in locations sealed off from the work area to prevent hazards from peroxide fumes. Very advantageously, the problem of bleedout of peroxide from polymeric pellets containing absorbed or admixed peroxide is overcome by the feature of maintaining the masterbatch pellets continuously at an elevated temperature from the time the peroxide is initially applied to the pellets until they enter the extruder for immediate admixture with the polyethylene pellets. It is commonly preferred to operate with the pellets at the highest temperature that will not lead to pellet softening (and consequent agglomeration), in order to achieve rapid production rates.

Figure 2:
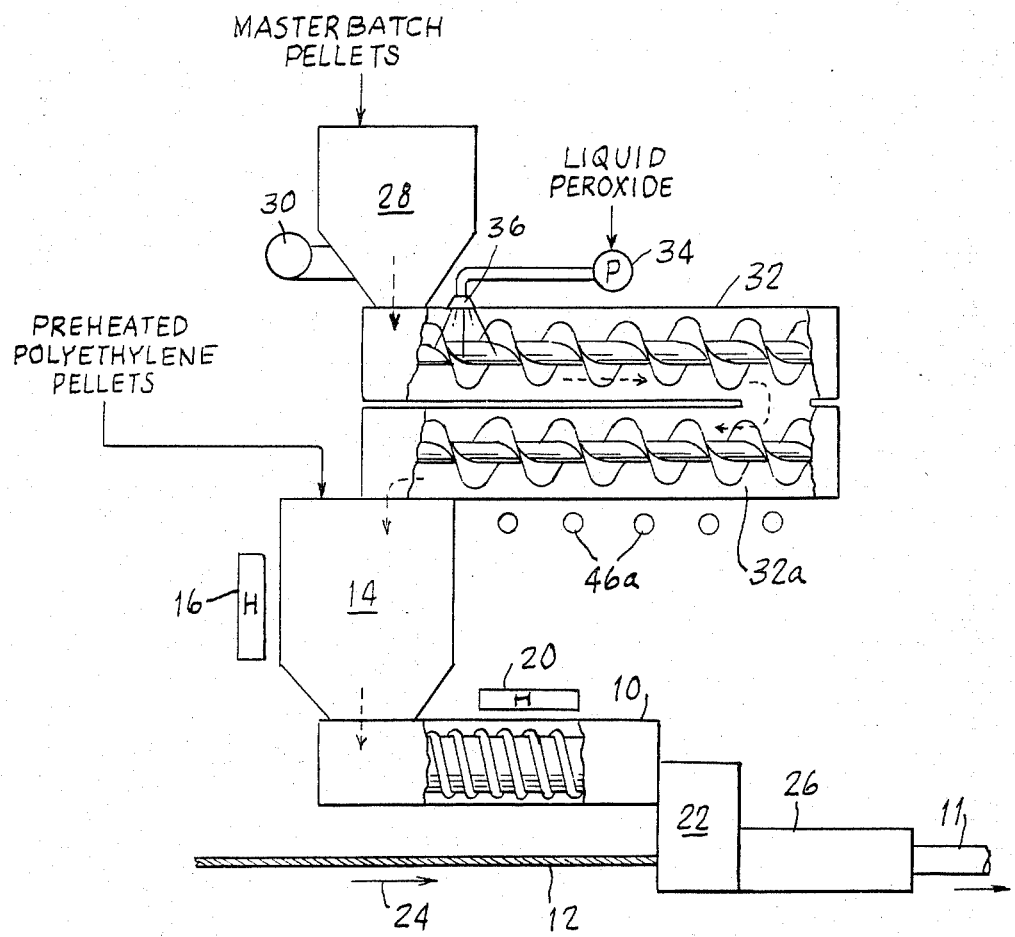
FIG. 2 is a similar view in illustration of another embodiment of the method of the invention.

The system illustrated in FIG. 2 differs from that of FIG. 1 in that the screw conveyor 32, suitably elongated, performs the dual functions of advancing the masterbatch pellets from the preheating hopper 28 to the main blender 14 and, at the same time, dispersing the peroxide and allowing its absorption. That is to say, an extended portion 32a of the screw conveyor 32 replaces the blending silo 38 of FIG. 1 with its ribbon blender 44 and the conveying means 40 of FIG. 1. The action of the conveyor screw is found to be entirely adequate to provide the requisite agitation of masterbatch pellets for dispersion of peroxide (applied to the pellet surfaces, as in FIG. 1, at the inlet end of the screw conveyor) and for prevention of pellet agglomeration or sticking before absorption of peroxide is complete. The conveyor barrel is sealed from the hopper 28 to the blender 14, to prevent escape of peroxide fumes, and is heated externally by means represented as heating coil 46a as necessary to maintain the temperature of the advancing masterbatch pellets continuously above the melting point of the peroxide until absorption is complete, and thereafter (i.e. if the peroxide is fully absorbed while the pellets are in the conveyor) at least at about 75° F. or above (preferably between about 75° and at least about 100° F.), throughout the length of the conveyor. Merely for convenience, the conveyor is shown as doubled back (the path of the masterbatch pellets again being represented by broken arrows), i.e. with two runs or flights, one above another. Preferably, though (as explained above with reference to FIG. 1) not necessarily, the rotational speed of the conveyor screw is selected to provide a dwell time of the masterbatch pellets in the conveyor, between spray head 36 and blender 14, sufficient to enable complete absorption of the applied peroxide in the pellets ahead of the blender 14, e.g. a residence time of 30 to 45 minutes.

It will be understood that in the hopper 28 in each of the illustrated systems (FIGS. 1 and 2), wherein hot air is circulated to preheat the pellets, the duration of the preheating (dwell time of the pellets in the hopper 28) determines the extent to which the pellets are heated, owing to their mass. It is desired that the pellets be preheated thoroughly, i.e. that each pellet be heated throughout its thickness rather than just at or adjacent its surface, so as to be delivered to the screw conveyor 32 at a temperature above (preferably much above) the melting point of the peroxide used.

In the screw conveyor 32 (and in the silo 38, when used), there is no circulation of heated (or other) air, but there is relatively little cooling, since the pellets, if thoroughly preheated, lose their heat only slowly, and indeed (e.g. when preheated throughout to about 140° F. or above) the pellets constitute the main source of heat in these portions of the system. At start-up, very preferably, the silo, screw conveyor and other system structures are preheated to avoid initial "plating out" of peroxide by contact with cold structure surfaces; preferably, also, the silo and other system elements are insulated to minimize heat losses. System temperatures tend to drift upwardly during the course of extended operation. In the silo 38, the pellets are preferably warmer than their surrounding environment, such that the peroxide will absorb well in the pellets. The operation of the system, for achieving absorption of peroxide in the pellets, is time-dependent, a dwell period of about 15 to 30 minutes ordinarily being required (i.e. after the peroxide is applied to the pellets) to achieve complete absorption of dicumyl peroxide in pellets preheated to 140° F. or higher.

Stated more broadly, the method of the invention is a dynamic operation in which the pellets are initially thoroughly preheated (so that they will maintain their temperature as they advance through the system) to a temperature preferably well above the peroxide melting point, and are then maintained above the peroxide melting point until the peroxide is fully absorbed, being thereafter maintained (until delivery to the extruder) at a temperature at least above that at which the amount of absorbed peroxide is soluble in the pellet polymer. Since the pellets (if thoroughly heated) cool slowly, it will be understood that the temperature-maintaining features of the method do not in all instances or at all stages require additional supply of heat, but may be partly performed by simply providing conditions (preheating of equipment, insulation, etc.) that sufficiently limit heat loss from the pellets to keep them above the peroxide melting point. Further, it will be understood that the peroxide is subject to "supercooling," i.e. it remains liquid (as necessary for absorption in the pellets) rather than crystallizing immediately when its temperature drops below its melting point. Thus, in the broadest sense, the stated step or feature of maintaining the masterbatch pellets above the peroxide melting point until absorption is complete involves maintaining the pellets at a high enough temperature (which may, in some instances, fall somewhat below the peroxide melting point as absorption approaches completion) so that the peroxide remains liquid until fully absorbed.

As will be recognized by those skilled in the art, the melting point of a particular peroxide is dependent on its purity. For example, the peroxide identified by the trade name "Vulcup," technical grade, melts at 113° F., while the purer research grade melts at 122° F.; technical grade dicumyl peroxide has a melting point of 86° F., and research grade dicumyl peroxide has a melting point of 100° F.

By way of further illustration of the invention, reference may be made to the following specific example employing the system of FIG. 1:

For extrusion of 3,000 lb./hr. of cable coating, incorporating 900 lb./hr. of masterbatch, balance low-density polyethylene, a hopper 28 having a 1,000-lb. capacity, a screw conveyor 32 having an internal diameter of 4 to 6 inches, and a blending silo 30 with a capacity of about 1,000 to 1,500 lbs. are employed. In a hypothetical but illustrative specific instance, using a 4-inch screw conveyor and a 1,000-lb. blending silo, the masterbatch pellets (free of peroxide) are heated to 140° F. in the hopper 28. The screw conveyor is operated on demand to maintain the blending silo level full. At the inlet of the screw conveyor, the preheated masterbatch pellets are coated with liquid dicumyl peroxide (commercially available under the trade name "DiCup T" [manufacturer: Hercules]), metered (in synchronism with screw rotation) in amounts to provide a concentration of 4.2% by weight of masterbatch in the final charge to the extruder. The blending silo is maintained (by external heating) at 90° F., with a dwell time of 45 minutes to 1 hour. From the silo, the pellets are conveyed by blower to the main blender and there commingled with polyethylene pellets for charging to the extruder and extrusion as a cable coating with subsequent heating of the coating to effect cross-linking.

The feasibility of such operation has been demonstrated by the following procedure:

Pellets of an ethylene propylene rubber masterbatch composition were preheated to 140° F. in a 1,000-lb. hopper with a forced air preheater. For use as the conveyor, a 4-inch grain auger about 12 feet long was wrapped with heating tape, covered with fiberglass insulation, and preheated to 140° F. The preheated masterbatch pellets were advanced through the auger from the hopper while "DiCup T" peroxide, preheated to 110° F., was injected into the base (pellet inlet end) of the auger at a rate equal to about 4% by weight of the advancing pellets. The pellets discharged from the auger after the 12-foot traverse of the auger were wet with peroxide, but when stored in drums the peroxide was fully absorbed (the pellets dried) because the asstored pellets retained sufficient heat for a sufficient period to complete the absorption of peroxide.

It is to be understood that the invention is not limited to the procedures and embodiments hereinabove specifically set forth, but may be carried out in other ways without departure from its spirit.

I claim:

1. In a method of producing a cross-linked extruded article of ethylene-containing polymer, wherein pellets of ethylene-containing polymer and a minor proportion of a peroxide cross-linking agent are charged to an extruder having a feed screw for heating, working and extrusion to form the article, followed by heating of the article to effect cross-linking thereof, the steps of
    (a) providing a first proportion of ethylene-containing polymer pellets, preheated to a temperature above the melting point of the peroxide, at a first locality;
    (b) advancing said first proportion of pellets from the first locality to a second locality while applying the peroxide in liquid state to the surfaces of the preheated pellets and agitating the last-mentioned pellets with the applied peroxide so as to disperse the peroxide for absorption in the pellets;
    (c) commingling said first proportion of pellets with a second proportion of preheated ethylene-containing polymer pellets at the second locality; and
    (d) after absorption of the peroxide in said first proportion of pellets is complete, delivering the commingled first and second proportions of pellets to the extruder for immediate admixture therein, while
    (e) continuously maintaining said first proportion of pellets at an elevated temperature throughout their advance from the first locality to the extruder, such that the temperature of the pellets is above the melting point of the peroxide until the peroxide is absorbed in the pellets and thereafter is at a value at which the amount of peroxide soluble in said first proportion of pellets is greater than the amount of peroxide absorbed in said first proportion of pellets.

2. A method according to claim 1, wherein the ethylene-containing polymer of said first proportion of pellets comprises an ethylene propylene rubber.

3. A method according to claim 2, wherein the ethylene-containing polymer of said second proportion of pellets comprises polyethylene.

4. A method according to claim 3, wherein the ethylene-containing polymer of said first proportion of pellets further comprises polyethylene.

5. A method according to claim 3, wherein said first proportion of pellets are pellets of a masterbatch comprising inert particulate filler material and an ethylene propylene rubber.

6. A method according to claim 5, wherein said article is a coating on an electrical conductor cable, and wherein said extruder extrudes onto a conductor cable a coating layer of admixed polyethylene, masterbatch, and peroxide.

7. A method according to claim 6, wherein said peroxide is dicumyl peroxide and is supplied, by application to the masterbatch pellets as aforesaid, in an amount equal to between about 1.5% and about 5% by weight of the masterbatch pellets delivered to the extruder.

8. A method according to claim 6, wherein the masterbatch pellets are advanced from said first locality along a confined path for continuously isolating said masterbatch pellets from the surrounding atmosphere at least until the applied peroxide is fully absorbed in the masterbatch pellets, and wherein the temperature-maintaining step comprises externally heating said confined path.

9. A method according to claim 8, wherein the advancing step comprises advancing the masterbatch pellets from said first locality in a screw conveyor and applying the liquid peroxide to the masterbatch pellets within the screw conveyor.

10. A method according to claim 9, wherein the advancing step comprises advancing the masterbatch pellets from said first locality to said second locality in said screw conveyor.

11. In a method of producing a cross-linked coating of filled polyethylene on electrical conductor cable, wherein pellets of polyethylene and pellets of a masterbatch comprising a mixture of inert particulate filler material and an ethylene propylene rubber are supplied, together with a minor proportion of a peroxide cross-linking agent, to an extruder having a feed screw for admixture therein and extrusion of a coating layer of admixed polyethylene, masterbatch and peroxide onto a conductor cable followed by heating of the coating layer to effect cross linking, the steps of
    (a) preheating the masterbatch pellets to a temperature above the melting point of the peroxide at a first locality;
    (b) advancing the masterbatch pellets from said first locality to a second locality while applying the peroxide in liquid state to the surfaces of the preheated masterbatch pellets and agitating the masterbatch pellets with the applied peroxide so as to disperse the peroxide for absorption in the masterbatch pellets;
    (c) at the second locality, commingling the masterbatch pellets with the polyethylene pellets, said polyethylene pellets being preheated prior to the commingling step; and
    (d) after absorption of the peroxide in the masterbatch pellets is complete, delivering the commingled masterbatch pellets and polyethylene pellets to the extruder for immediate admixture therein, while
    (e) continuously maintaining said masterbatch pellets at an elevated temperature during performance of steps (b), (c), and (d), such that the temperature of the masterbatch pellets is above the melting point of the peroxide until the peroxide is absorbed in the pellets and thereafter is at a value at which the amount of peroxide soluble in the masterbatch pellets exceeds the amount of peroxide absorbed therein.

12. A method according to claim 11, wherein the masterbatch pellets are advanced from said first locality along a confined path for continuously isolating said masterbatch pellets from the surrounding atmosphere at least until the applied peroxide is fully absorbed in the masterbatch pellets, and wherein the temperature-maintaining step comprises externally heating said confined path.

13. A method according to claim 12, wherein the advancing step comprises advancing the masterbatch pellets from said first locality in a screw conveyor and applying the liquid peroxide to the masterbatch pellets within the screw conveyor.

14. A method according to claim 13, wherein the advancing step comprises advancing the masterbatch pellets from said first locality to said second locality in said screw conveyor.

15. A method according to claim 13, wherein the advancing step further comprises delivering said masterbatch pellets from said screw conveyor to a blending silo for completion of absorption of the peroxide in the masterbatch pellets, and thereafter delivering the masterbatch pellets from said silo to said second locality.

16. A method according to claim 12, wherein the masterbatch pellets are retained in said confined path ahead of said second locality until the peroxide is completely absorbed.

17. A method according to claim 11, wherein said masterbatch pellets are preheated in step (a) to a temperature between about 90° and about 180° F. at said first locality and in step (e) are maintained at a temperature between about 75° and at least about 100° F. after initial absorption of the peroxide.

* * * * *